United States Patent
Cho

(10) Patent No.: US 12,502,790 B2
(45) Date of Patent: Dec. 23, 2025

(54) VACUUM CONTROL UNIT

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 492 days.

(21) Appl. No.: 18/298,848

(22) Filed: Apr. 11, 2023

(65) Prior Publication Data

US 2024/0165823 A1 May 23, 2024

(30) Foreign Application Priority Data

Nov. 18, 2022 (KR) .................. 10-2022-0155002

(51) Int. Cl.
*G06F 7/00* (2006.01)
*B25J 13/08* (2006.01)
*B25J 15/06* (2006.01)

(52) U.S. Cl.
CPC ......... *B25J 13/087* (2013.01); *B25J 15/0616* (2013.01)

(58) Field of Classification Search
CPC . B25J 13/087; B25J 9/1612; B25J 7/00; B25J 9/1633; B25J 13/00; B25J 13/08–082; B25J 13/085; B25J 15/00; B25J 15/06; B25J 15/0616–0633; B25J 15/0641; B25J 15/065; B25J 15/0658; B25J 19/02; G05B 2219/39557; G05B 19/048; G05B 19/10; G05B 19/4065; G05B 19/43–44; G05B 2219/39558; B65G 53/24; B65G 43/00; B65G 53/28; B65G 53/42; B65G 53/50; B65G 2201/02; B65G 35/00

USPC ..... 700/213, 218, 228; 414/1, 3–7, 754–755
See application file for complete search history.

(56) References Cited

U.S. PATENT DOCUMENTS

| | | | |
|---|---|---|---|
| 4,650,234 A | 3/1987 | Blatt | |
| 5,059,088 A | 10/1991 | Klein | |
| 5,188,411 A | 2/1993 | Golden | |
| 5,284,416 A | 2/1994 | Schmidt et al. | |
| 5,470,117 A | 11/1995 | Schmidt | |
| 5,501,415 A | 3/1996 | Harris et al. | |
| 5,566,718 A | 10/1996 | Nagai et al. | |
| 5,601,415 A | 2/1997 | Nagai et al. | |
| 6,382,257 B2 | 5/2002 | Mead et al. | |

(Continued)

FOREIGN PATENT DOCUMENTS

| | | | | |
|---|---|---|---|---|
| CN | 104204542 A | * | 12/2014 | .......... B25J 15/0625 |
| JP | H0573106 A | | 3/1993 | |

(Continued)

*Primary Examiner* — Yolanda R Cumbess
(74) *Attorney, Agent, or Firm* — INNOVATION CAPITAL LAW GROUP, LLP; Vic Lin

(57) ABSTRACT

The present invention relates to a vacuum control unit that outputs an operation signal for transfer of an object depending on each internal pressure condition of a plurality of vacuum pumps in a vacuum transfer system. The control unit includes a module stack in which modules individually corresponding to each vacuum pump are assembled in a close contact manner and a control unit disposed at one side of the stack and being in signal connection with each module. Each module includes one side sensor unit configured to detect inner pressure of the vacuum pump and the other side terminal unit connected to an electronic valve configured to open and close a compressed air inlet of the vacuum pump.

10 Claims, 4 Drawing Sheets

(56) References Cited

U.S. PATENT DOCUMENTS

| | | |
|---|---|---|
| 7,267,382 B2 | 9/2007 | Gieskes et al. |
| 7,677,622 B2 | 3/2010 | Dunkmann et al. |
| 8,550,790 B2 | 10/2013 | Tell |
| 8,560,121 B2 | 10/2013 | Hjørnet |
| 8,678,776 B2 | 3/2014 | Medow et al. |
| 8,855,818 B2 | 10/2014 | Hashimoto |
| 9,334,128 B2 | 5/2016 | Milhau et al. |
| 9,656,813 B2 | 5/2017 | Dunkmann et al. |
| 2008/0202602 A1 | 8/2008 | Flaim et al. |
| 2008/0291235 A1 | 11/2008 | Schmalz |
| 2010/0303641 A1 | 12/2010 | Medow et al. |
| 2015/0147141 A1 | 5/2015 | Truyens |
| 2017/0341880 A1* | 11/2017 | Strobel ................. B66C 1/0218 |

FOREIGN PATENT DOCUMENTS

| | | |
|---|---|---|
| JP | H07297600 A | 11/1995 |
| JP | 2009056514 A | 3/2009 |
| KR | 20000026642 A | 5/2000 |
| KR | 20150103808 A | 9/2015 |
| KR | 101860643 B1 | 5/2018 |
| KR | 102096365 B1 | 4/2020 |
| WO | WO-2018167764 A1 * | 9/2018 ........... B25B 11/005 |

\* cited by examiner

[Fig. 1]
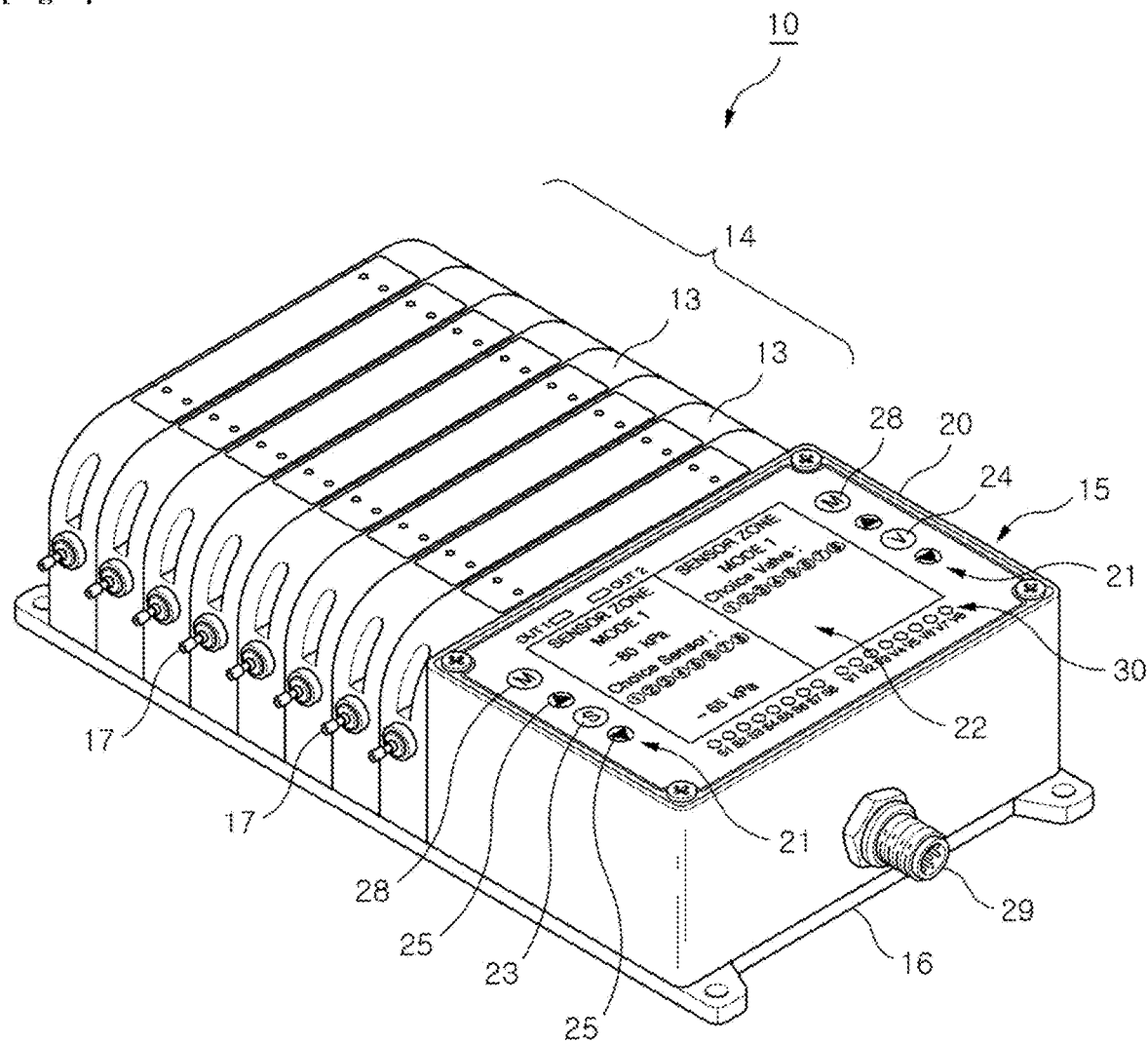

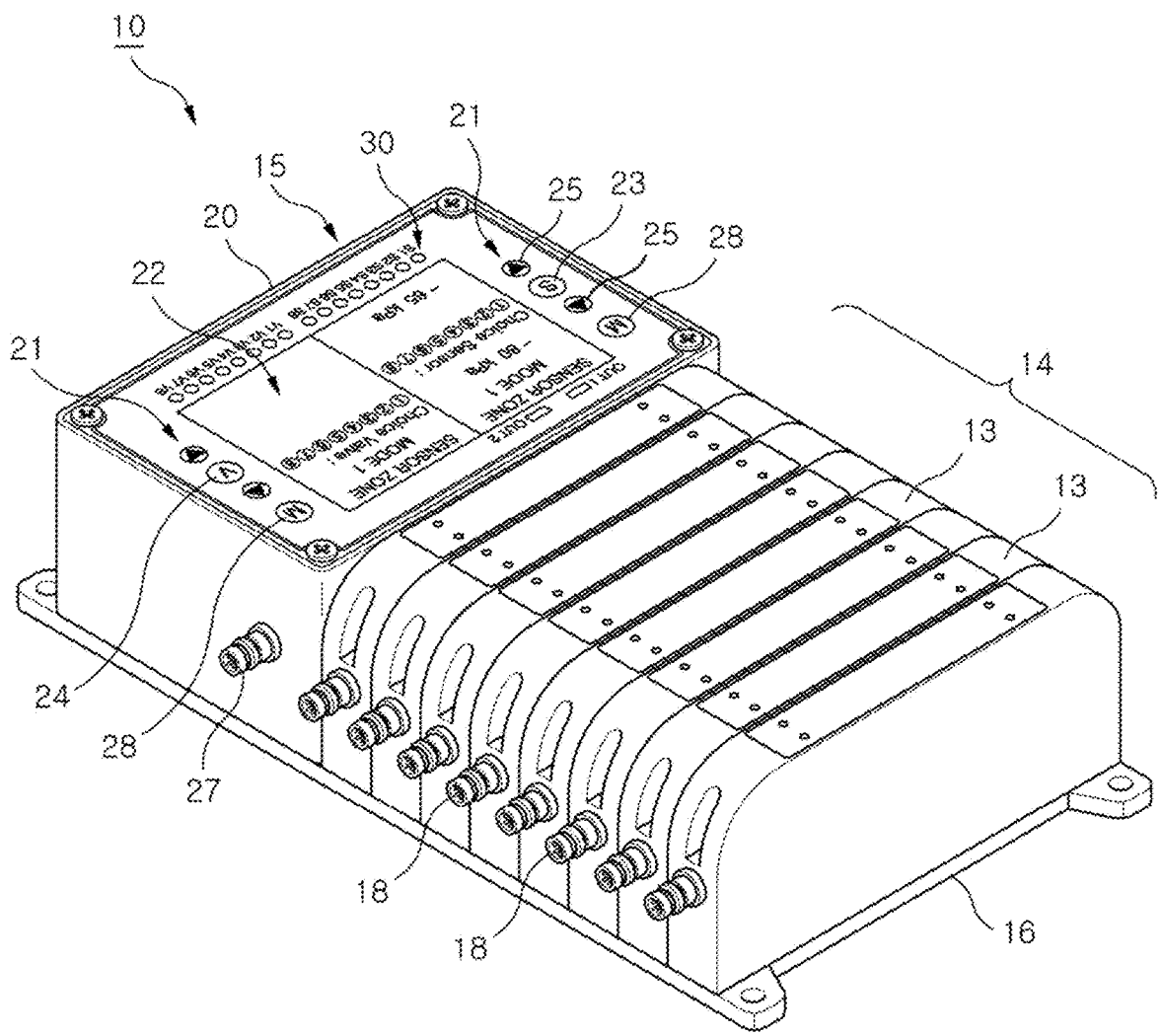
[Fig. 2]

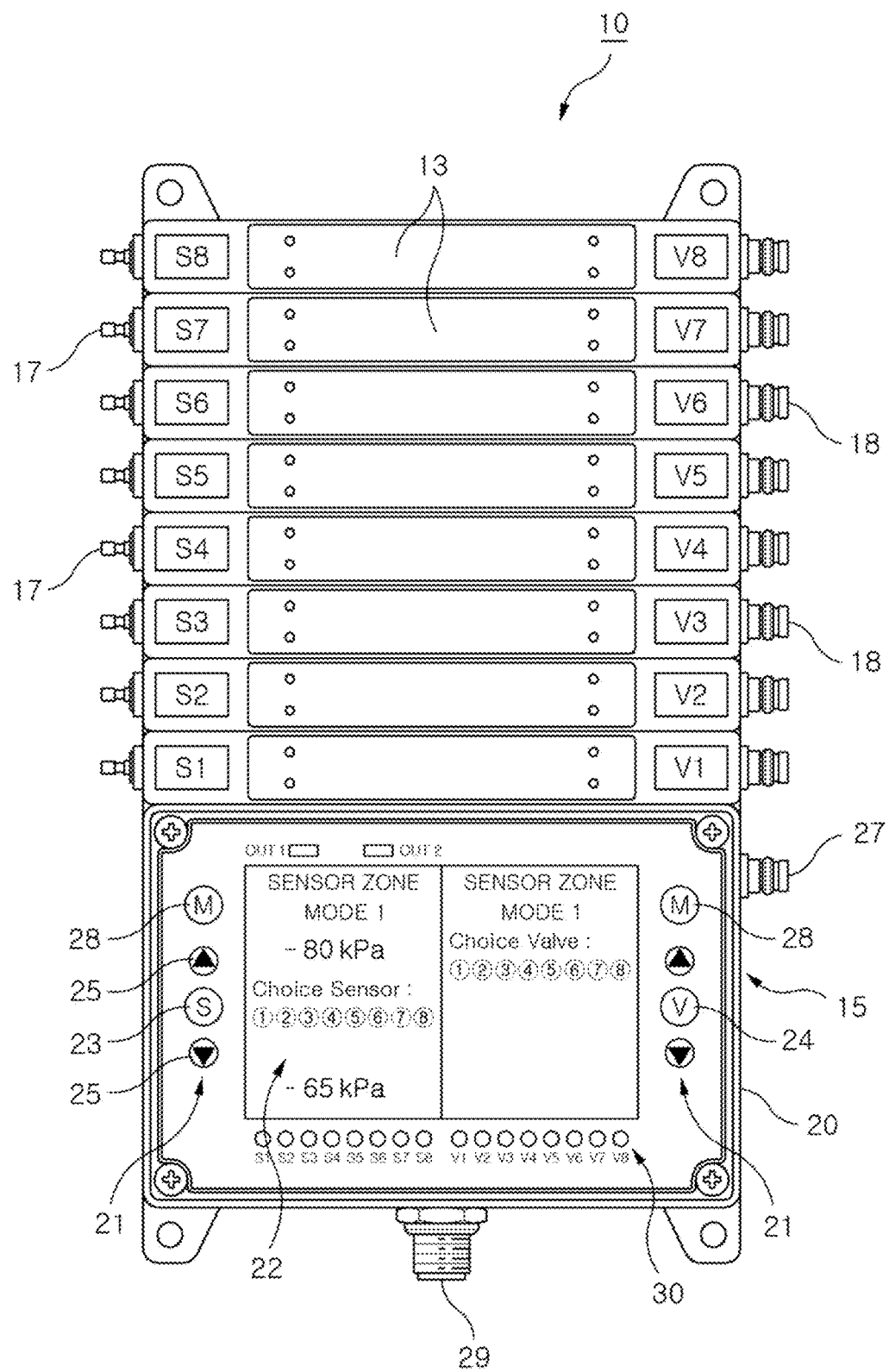
[Fig. 3]

[Fig. 4]
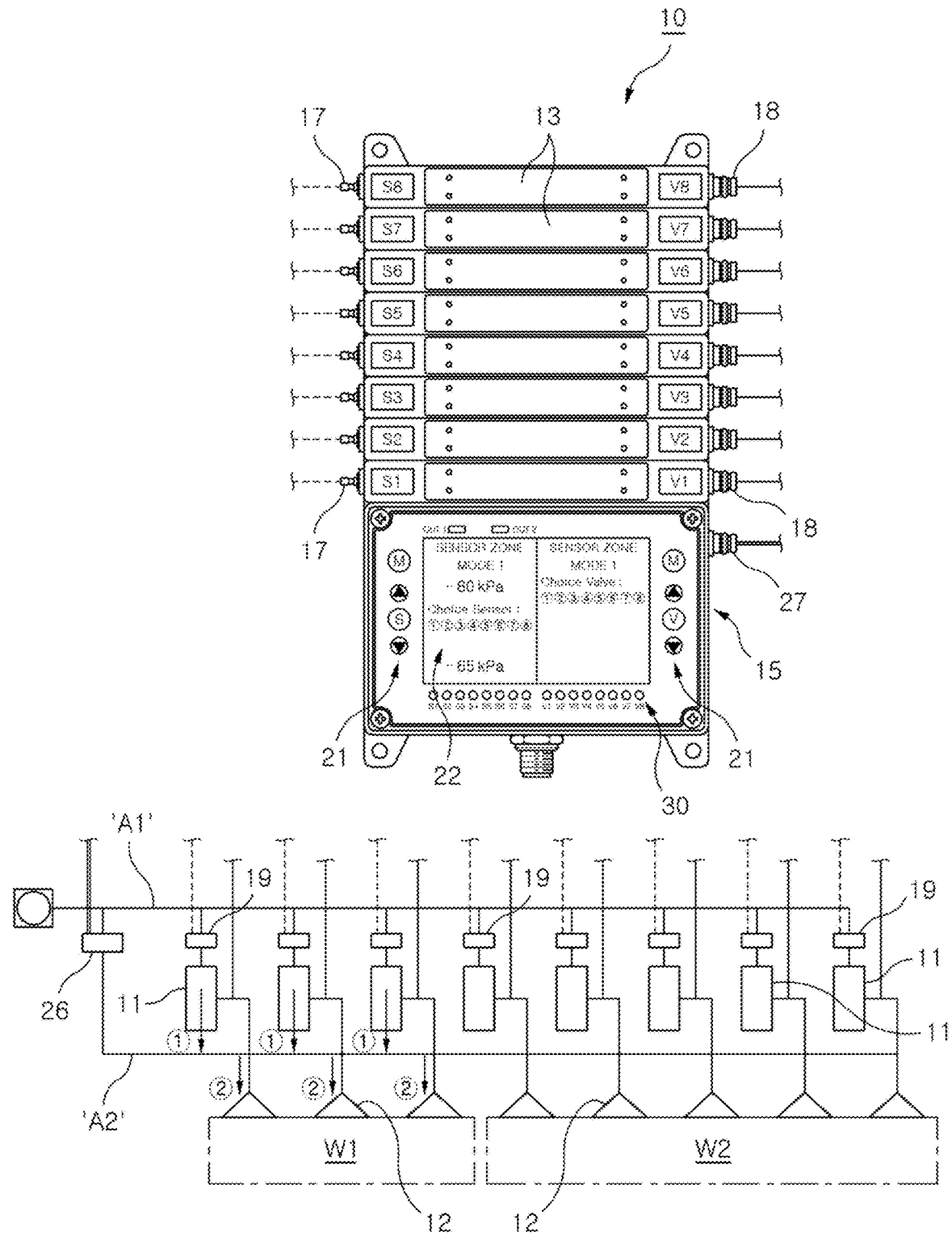

VACUUM CONTROL UNIT

CROSS-REFERENCE TO RELATED APPLICATIONS

This U.S. non-provisional patent application claims priority under 35 U.S.C. § 119 of Korean Patent Application No. 10-2022-0155002 filed on Nov. 18, 2022, the entire contents of which are hereby incorporated by reference.

BACKGROUND

The present invention relates to a vacuum control unit that is used together with a vacuum pump in a vacuum transfer system, and more particularly, to a vacuum control unit that is integrally designed in correspondence to a plurality of vacuum pumps.

A vacuum transfer system refers to a system that exhausts an inner space of a suction pad by using a vacuum pump acting by compressed air to generate negative pressure therein, suctions and grips an object by using the generated negative pressure, and then transfers the object to a target place.

In terms of exhaust, while compressed air passes through a vacuum pump at high speed, the air in the pad is introduced into the vacuum pump and discharged to the outside together with the compressed air, and thus vacuum and negative pressure are formed inside the vacuum pump and the pad.

One or more vacuum pumps may be provided in the system depending on objects or characteristics of a work, and the present invention is based on a latter case.

A so-called 'vacuum control unit' is attached to the vacuum pump to detect a magnitude of internal pressure of the corresponding vacuum pump and outputs an 'operation' signal for a post-suction process, i.e., transfer of the object when the pressure reaches a predetermined level. In terms of a structure, the vacuum control unit includes a case containing a predetermined control unit and a sensor, an information display part and a pressure setting part disposed on a top surface of the case, and a port disposed at one side of the case and communicating with the vacuum pump.

As the control unit is attached to the vacuum pump through the port, the sensor may detect the internal pressure of the vacuum pump, i.e., vacuum pressure (−kPa).

Since an appropriate pressure level required for suction and transfer is different depending on the kind or characteristics of the object, a signal output condition of the corresponding control unit may be set by manipulating the pressure setting part before operating the system. When pressure detected by the sensor reaches the set level while the system is operated, the vacuum control unit outputs an operation signal, and accordingly, a robotic arm is operated to transfer the object to a predetermined position.

Substantially, the vacuum control unit having the above-described structure is frequently used at work sites for product transfer. However, a system including a plurality of vacuum pumps has a limitation in that installation, management, and operation of each unit are difficult because as many vacuum control units as the number of vacuum pumps are required, and also collective and efficient control of all units is impossible. Due to the above-described limitation, a 'vacuum multi-sensing unit' is disclosed in Korean Patent Registration No. 10-2096365.

The multi-sensing unit disclosed in this patent includes a plurality of sensors installed parallel to each other at one side of the case and individually corresponding to each vacuum pump and outputs an operation signal for transfer of an object when a predetermined level of pressure is detected by a plurality of sensors selected for a specific work. A device configured and operating similarly, but not identically to those described above, is disclosed in Japanese Laid-Open Patent Publication No. 1993-073106 and U.S. Pat. No. 5,601,415.

The multi-sensing unit has an advantage in structure in that the above-described control units are integrated into one, but has following limitations.

First, the multi-sensing unit has a technical limitation in that a specific control method for efficient supply of compressed air is not provided.

For example, whether compressed air is supplied to both selected and unselected vacuum pumps for a work among an array of the vacuum pumps, whether compressed air is continuously supplied when the vacuum pump selected for the work reaches a set pressure or even after that, and how to compensate a vacuum level when vacuum leakage occurs while transferring the object may be important factors for energy saving and work stability. However, the multi-sensing unit does not suggest a measure related to this limitation.

Second, the multi-sensing unit has a usage limitation in which variable application depending on a work may not be applied because the number of installed sensors is initially fixed.

For example, the multi-sensing unit may not be applied to a work requiring the greater number of vacuum pumps than the number of installed sensors and create unnecessary parts in a work requiring fewer vacuum pumps. That is, the number and position of the sensors are fixed when the units are manufactured, and thus, the variable application of the sensors depending on the kind or characteristics of the object and the work may not be applied.

RELATED ART DOCUMENTS

Korean Patent Registration No. 10-1860643
Korean Patent Registration No. 10-2096365
Laid-Open Patent Publication No. 1993-073106
U.S. Pat. No. 5,601,415

SUMMARY

The present invention is proposed to solve the above-described limitations of the related art. The present invention provides a vacuum control unit used in a vacuum transfer system, which is capable of using an energy-efficient control method for supply of compressed air and a method for securing improved work stability and simultaneously adjusting, adding, and subtracting the number of sensors as many as structural necessity.

The present invention provides a vacuum control unit in a device configured to output an operation signal of transfer of an object according to each inner pressure condition of a plurality of vacuum pumps in a vacuum transfer system, the vacuum control unit including a module stack in which modules individually corresponding to each vacuum pump are assembled in a close contact manner and a control unit disposed at one side of the stack and being in signal connection with each module. Here, each module includes one side sensor unit configured to detect inner pressure of the corresponding vacuum pump and the other side terminal unit connected to an electronic valve configured to open and close a compressed air inlet of the vacuum pump, the control unit blocks supply of compressed air to the corresponding vacuum pump by outputting a 'close' signal of the electronic valve through the terminal unit when sensed pressure of each sensor unit of the module reaches a set value.

In an embodiment, the control unit may include a manipulation part and a display part disposed on a top surface of a case containing a circuit unit, the manipulation part may include a sensor-selection switch configured to select one or more of the sensor units of each module, a vacuum-selection switch configured to select one or more of the terminal units, and a pressure-setting switch configured to set target pressure of each selected sensor unit, and the display part may be a display panel that allows a result of selecting and setting of each switch (23, 24, and 25) caused by user manipulation to be checked by naked eyes.

For example, when the sensed pressure of the sensor unit decreases by a predetermined range or more from the set value after the supply of the compressed air is blocked, the control unit may resume the supply of the compressed air to the corresponding vacuum pump by outputting an 'open' signal of the electronic valve through the terminal unit corresponding to the sensor unit.

Preferably, the vacuum control unit may further include a break terminal connected to an electronic valve configured to apply direction change of the compressed air.

Here, the control unit may directly supply compressed air to a suction pad connected to each vacuum pump by outputting an 'open' signal of the electronic valve through the break terminal when the transfer of the object is completed.

Specifically, the manipulation part may further include a mode-selection switch configured to select and operate one of a plurality of operation modes stored in a memory of the control unit.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 1 is a front perspective view of a vacuum control unit according to the present invention;

FIG. 2 is a rear perspective view of FIG. 1;

FIG. 3 is a plan view of FIG. 1; and

FIG. 4 is a configuration view of a system including the vacuum control unit according to the present invention.

DETAILED DESCRIPTION

Features and operational effects of a 'vacuum control unit' according to the present invention described or not described above will be more apparent through a description of a preferred embodiment described below with reference to the accompanying drawings. In the accompanying drawings, reference numeral '10' indicates the vacuum control unit according to the present invention.

Referring to FIGS. 1 to 4, a vacuum control unit 10 according to the present invention basically refers to a device of sensing inner pressure of each of a plurality of vacuum pumps 11 and outputting an operation signal for transferring an object W1 according to a condition in a vacuum transfer system. As is known, a vacuum transfer system refers to a system that exhausts an inner space of a suction pad by using a vacuum pump acting by compressed air to generate negative pressure therein, suctions and grips an object by using the generated negative pressure, and then transfers the object to a target place.

In FIG. 4, reference numeral 12 indicates the suction pad that is individually connected to each vacuum pump 11.

As a whole, the vacuum control unit 10 includes a module stack 14 in which a plurality of modules 13 individually corresponding to the vacuum pumps 11 are assembled in a close contact manner and a control unit 15 disposed at one side of the stack 14 and being in signal connection with each of the modules 13.

Here, each module 13 forming the stack 14 and the control unit 15 may be assembled and arranged on a predetermined installation base 16 in a close contact manner.

Specifically, each module 13 includes one side sensor unit 17 sensing inner pressure (−kPa) of the corresponding vacuum pump 11 and the other side terminal unit 18 connected to an electronic valve 19 that opens and closes a compressed air inlet of the vacuum pump 11. For convenience of manufacturing, the sensor unit 17 and the terminal unit 18 are disposed on opposite sides of the module 13. As is well known, the vacuum pump 11 includes one side inlet and the other side outlet and is configured such that inner air of the suction pad 12 is introduced into the vacuum pump 11 and discharged together with the compressed air when high-speed compressed air A1 passes through the inlet and the outlet (refer to arrow ① in FIG. 4).

The electronic valve 19 is disposed at a front end of the inlet of each vacuum pump 11 and operated to close or open the corresponding inlet, and the control unit 15 outputs an operation signal of the electronic valve 19 under a predetermined condition. Here, the electronic valve 19 is a typical solenoid valve that is operated by an electrical signal.

Here, the control unit 15 outputs a 'close' signal of the electronic valve 19 through the terminal unit 18 when a pressure value detected by the module sensor unit 17 reaches a set value. Here, obviously, supply of the compressed air to the vacuum pump 11 is blocked, and thus, energy is not unnecessarily consumed. Alternatively, even in this case, pressure sensing on the corresponding pump 11 of the sensor unit 17 is not interrupted.

In the embodiment, the control unit 15 includes a manipulation part 21 for a user, which is formed on a top surface of the case 20 containing a circuit unit, and a display part 22 displaying a state manipulated by the user.

Specifically, the manipulation part 21 includes: a sensor-selection switch 23 capable of selecting one or more of the sensor units 17 of each module 13, a vacuum-selection switch 24 capable of selecting one or more of the terminal units 18, and a pressure-setting switch 25 for setting target pressure of each selected sensor unit 17, and the display part 22 is a display panel that displays a detected pressure value of each sensor unit 17 and is organically connected with each of the switches 23 to 25 to allow a result of selecting and setting of the user caused by switch manipulation to be checked by naked eyes.

Obviously, the manipulation part 21 may be properly operated by the user in consideration of types or characteristics of the object W1 to be transferred.

While the vacuum system is operated, the high-speed compressed air A1 supplied from a separate device passes through the open electronic valve 19 and is discharged to the outside through the vacuum pump 11. In the above-described process, vacuum and negative pressure are generated in the inner space of each of the vacuum pump 11 and the suction pad 12 while the inside of the suction pad 12 is exhausted, and at the same time, the suction pad 12 grips the object W1 by the generated negative pressure.

When the inner pressure of each of the vacuum pumps 11 detected by the sensor unit 17 satisfies a condition set by the manipulation part 21, the control unit 15 outputs an operation signal for transferring the object W1. For example, when the supply of the compressed air to the vacuum pump 11 is blocked and then vacuum leakage occurs, safety of transfer may be seriously damaged. However, slight leakage is considered not to affect the safety thereof.

Thus, in this embodiment, when the supply of the compressed air A1 to each vacuum pump 11 is blocked, and then the pressure detected by the sensor unit 17 decreases to be equal to or less than a predetermined range from a value set by the manipulation part 21, the control unit 15 outputs an 'open' signal of the electronic valve 19 through the corresponding terminal unit 18 to the sensor unit 17 to resume the supply of the compressed air A1 to the corresponding vacuum pump 11, thereby correcting and compensating decreased vacuum to the vacuum pump 11.

This type of compensation method has an effect of significantly reducing a usage amount of energy, i.e., the compressed air and maximally guaranteeing the safety of the transfer of the object W1. To this end, the pressure-setting switch 25 of the manipulation part 21 may set upper and lower limit values in a reachable pressure range, and for example, the control unit 15 is designed to output the 'close' signal of the electronic valve 19 when the sensor unit 17 detects the upper limit value and the 'open' signal of the electronic valve 19 when the sensor unit 19 detects the lower limit value.

When safe transfer of the object W1 is completed, the suction pad 12 may be separated from the object W1 and prepared for a next operation. In order to quickly perform this process, separation of the suction pad 12 needs to be forcedly performed.

Thus, in this embodiment, the vacuum control unit 10 includes a break terminal 27 disposed on one side of the control unit 15 and connected to the electronic valve 26 for applying a direction change of compressed air. Accordingly, when the transfer of the object W1 is completed, as the 'open' signal of the electronic valve 26 is outputted through the break terminal 27, the compressed air A2 may be directly supplied into each suction pad 12 (refer to arrow ② in FIG. 4). Thus, vacuum in the suction pad 12 may be broken and at the same time, the suction pad 12 may be quickly separated from the object W1. As described above, the electronic valve 26 may be also a typical solenoid valve.

Reference numeral 29 indicates a pin-type cable connector for transmitting power and a signal to the vacuum control unit 10. The single connector 29 is disposed at one side of the case 20, and a single cable is also connected to the connector 29.

On the other hand, the manipulation part 21 further includes a mode-selection switch 28 capable of selecting and operating one of a plurality of operation modes stored in a memory of the control unit 15. Thus, the vacuum control unit 10 according to the present invention may be used more conveniently and stably by selecting an appropriate mode and operating the system in consideration of types or characteristics of the object W1 depending on each case.

Examples of an operation mode applied to the embodiment are described below, and each mode has an individual operation condition for the transfer of the object W1. As eight modules 13 are provided as with the drawings, the sensor units 17 of the modules 13 are indicated by 'sensors' S1 to S8, respectively, and since the terminal units 18 corresponding to the sensor units 17 are connected to the electronic valves 19, respectively, the terminal units 18 are indicated by 'valves' V1 to V8, respectively. On the other hand, selection of the sensor and the valve for gripping and transferring the specific object W1 and setting of target pressure for each vacuum pump 11 are determined by manipulating each switch 23, 24, and 25 of the manipulation part 21.

[Mode 1]

This mode is designed to set the same pressure value for the sensors S1, S2, and S3 selected among the sensor units 17 and output an operation signal for transferring the object W1 when all of the selected sensors detect the set pressure value. In this mode, for convenience, when a pressure value is set for one of the selected sensors, the same value is automatically set for the other sensors, and a mean value of pressure obtained from each selected sensor is displayed on the display unit 22.

In the drawing, '−80 kPa' indicates the set pressure value of each sensor, and '−65 kPa' indicates the current mean pressure value detected while the system is operated.

The sensor may be randomly selected as needed, and the valve may be also randomly selected in the same manner. However, selecting of the valve that does not correspond to the selected sensor may have no meaning. In this mode, for convenience, the corresponding valves V1, V2, V3, and V4 may be automatically selected at the same time when each sensor is selected, and the selected valves are collectively or selectively turned-on or off by the above operation signal.

This mode may be appropriately used for a safety required transfer line and repeated transfer of the object W1 having the same shape. Here, when the selected sensor is operated normally to detect the set pressure, a corresponding LED 30 is displayed in green (G).

[Mode 2]

This mode is designed to set the same pressure value for the sensors S1, S2, and S3 selected among the sensor units 17 and output the operation signal for transferring the object W1 when a mean value of the pressure obtained from each sensor reaches a set mean value of pressure although one or some of the selected sensors does not detect the set pressure value. Setting of a pressure value of each sensor, displaying of the mean value of detected pressure, and selecting and controlling of each valve are the same as those in a case of the above [Mode 1].

This mode can be suitably used for transfer of an object having a variable shape or the transfer of the object W1 having a possibility of vacuum leakage as with object having a variable shape, a plastic pack or a thin-film. Here, when the selected sensor is operated normally to detect the set pressure, the corresponding LED 30 is displayed in green (G).

Although selected above, the sensor that does not detect the set pressure value for a predetermined time or the number of times is displayed by, e.g., flashing of the corresponding LED 30 in red (R) as identification thereof. This represents that the vacuum pump 11 or the suction pad 12 connected to the sensor has a problem, and the sensor is required to be checked. When the detected value of the sensor does not continue to exceed a predetermined level, e.g., about 20% in comparison with the set value, since it is recognized that the vacuum pump 11 does not participate in gripping the object W1, the corresponding electronic valve 19 may be blocked so that the compressed air is not further supplied, and thus unnecessary waste of energy may be prevented.

[Mode 3]

This mode is designed to set partially different pressure values for the sensors S1, S2, and S3 selected among the sensor units 17 and output an operation signal for transferring the object W1 when all of the selected sensors detect the individually set pressure values.

Other than that, displaying of the mean value of detected pressure or selecting and controlling of each valve are the same as those in a case of the above [Mode 1].

This mode may be suitably used for the transfer of the object W1 with a non-uniform surface and a possibility of vacuum leakage in a specific area. Here, when the selected sensor is operated normally to reach the set pressure, the corresponding LED 30 is displayed in green (G).

[Mode 4]

This mode is designed to distinguish the modules 13 into a plurality of groups and output an operation signal for transfer of each object W1 or W2 for each group when sensors S1 to S3 and S4 to S8 contained in each group satisfy a predetermined sensing condition, e.g., a sensing condition defined as one of the above [Mode 1] to [Mode 3]. Here, obviously, setting of a pressure value of each sensor for each group, displaying of a mean value of detected pressure, and selecting and controlling of each valve depend on a condition of an individual mode selected for the corresponding group.

This mode may be suitably used when a transfer operation for two or more objects W1 and W2 using one vacuum control unit 20 is necessary to be performed at the same time.

Here, although not shown in the drawing, a mean value of sensed pressure for each group may be compared and outputted.

The compressed air for the transfer of the objects W1 and W2 in the vacuum transfer system and each of the above-described modes basically may stand by on a 'A1' line and be supplied to the vacuum pump 11 when the electronic valve 19 is opened. After transferred, the compressed air may be instantly supplied to the suction pad 12 through a 'A2' line while the electronic valve 26 disposed at a front end of the system is opened, and thus the suction pad 12 may be quickly separated from the object W1 and W2.

The vacuum control unit according to the present invention basically includes the module stack corresponding to the plurality of vacuum pumps and the integrated control unit. Particularly, the control unit may efficiently control the supply of the compressed air to each vacuum pump to maximally save energy and improve work stability, structurally add or subtract the number of modules, thereby adjusting the size of the stack depending on the number of vacuum pumps provided for the work.

In the preferred embodiment, the vacuum control unit according to the present invention may include the mode-selection switch, and, through this, the optimized driving pattern depending on cases may be selected and used. Also, as the separate vacuum break unit is provided to the control unit, the suction pad may be quickly separated from the object after the transfer operation is completed.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A vacuum control unit in a device configured to output an operation signal for transfer of an object according to each inner pressure condition of a plurality of vacuum pumps (11) in a vacuum transfer system, the vacuum control unit comprising:

a module stack (14) in which modules (13) individually corresponding to each vacuum pump (11) are assembled in a close contact manner and a control unit (15) disposed at one side of the stack (14) and being in signal connection with each module (13);

wherein each module (14) comprises one side sensor unit (17) configured to detect inner pressure of the corresponding vacuum pump (11) and the other side terminal unit (18) connected to an electronic valve (19) configured to open and close a compressed air inlet of the vacuum pump (11);

wherein the control unit (15) blocks supply of compressed air (A1) to the corresponding vacuum pump (11) by outputting a 'close' signal of the electronic valve (19) through the terminal unit (18) when sensed pressure of each sensor unit (17) of the module reaches a set value; and the vacuum control unit further comprises a break terminal (27) connected to an electronic valve (26) configured to apply direction change of the compressed air (A1); and wherein the control unit (15) directly supplies compressed air (A2) to a suction pad (12) connected to each vacuum pump (11) by outputting an 'open' signal of the electronic valve (26) through the break terminal (27) when the transfer of the object is completed.

2. The vacuum control unit of claim 1, the control unit (15) comprises a manipulation part (21) and a display part (22) disposed on a top surface of a case (20) containing a circuit unit;

wherein the manipulation part (21) comprises a sensor-selection switch (23) configured to select one or more of the sensor units (17) of each module (13), a vacuum-selection switch (24) configured to select one or more of the terminal units (18), and a pressure-setting switch (25) configured to set target pressure of each selected sensor unit (17); and wherein the display part (22) is a display panel that allows a result of selecting and setting of each switch (23, 24, and 25) caused by user manipulation to be checked.

3. The vacuum control unit of claim 1, wherein when the sensed pressure of the sensor unit (17) decreases by a predetermined range or more from the set value after the supply of the compressed air is blocked, the control unit (15) resumes the supply of the compressed air to the corresponding vacuum pump (11) by outputting an 'open' signal of the electronic valve (19) through the terminal unit (18) corresponding to the sensor unit (17).

4. The vacuum control unit of claim 1, wherein each module (13) and the control unit (15) of the stack (14) come in close contact with each other on an installation base (16).

5. The vacuum control unit of claim 2, wherein the manipulation part (21) further comprises a mode-selection switch configured to select and operate one of a plurality of operation modes stored in a memory of the control unit (15).

6. The vacuum control unit of claim 5, wherein the mode comprises a method for setting the same pressure value to selected sensors (S1, S2, and S3) among the sensor units (17) and outputting an operation signal for transfer of an object (W1) when all of the selected sensors detect the set pressure value.

7. The vacuum control unit of claim 5, wherein the mode comprises a method for setting the same pressure value to selected sensors (S1, S2, and S3) among the sensor units (17) and outputting an operation signal for transfer of an object (W1) when a mean value of pressure obtained from each selected sensor reaches a mean value of pressure set to each sensor although one or some of the selected sensors do not detect the set pressure value.

8. The vacuum control unit of claim 7, wherein the mode recognizes that the corresponding vacuum pump (11) does not participate in gripping of the object (W1) to block the corresponding electronic valve (19) when a sensed value of the sensor does not continue to exceed a predetermined level in comparison with the set value in the sensor that does not detect the set pressure value.

9. The vacuum control unit of claim 5, wherein the mode comprises a method for setting different pressure values to selected sensors (S1, S2, and S3) among the sensor units (17) and outputting an operation signal for transfer of an object (W1) when all of the selected sensors detect individually set pressure values.

10. The vacuum control unit of claim 5, wherein the mode comprises a method for distinguish the modules (13) into a plurality of groups and outputting an operation signal for transfer of each object (W1 and W2) for each group when sensors (S1 to S3) and (S4 to S8) contained in each group satisfy the above-described predetermined sensing condition.

\* \* \* \* \*